Aug. 1, 1961  S. J. SKIRPAN  2,994,804
LIGHTING CONTROL SYSTEM
Filed June 17, 1957  8 Sheets-Sheet 1

INVENTOR.
STEPHEN JAMES SKIRPAN
BY
ATTORNEY

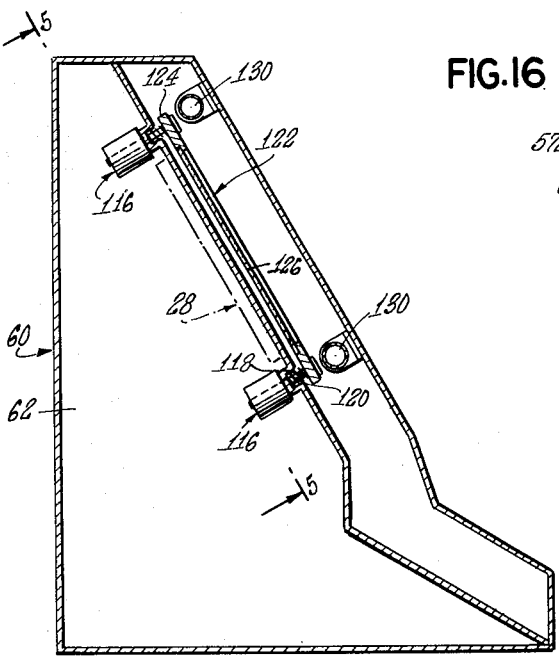
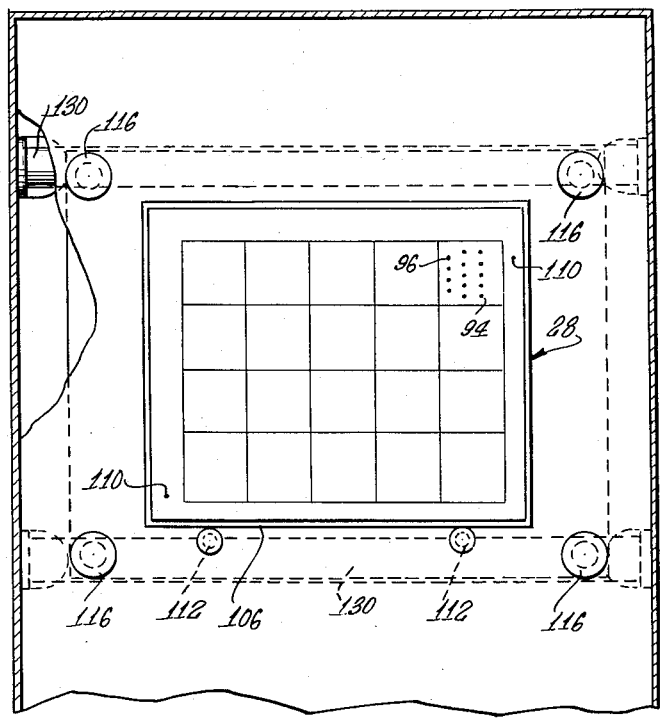
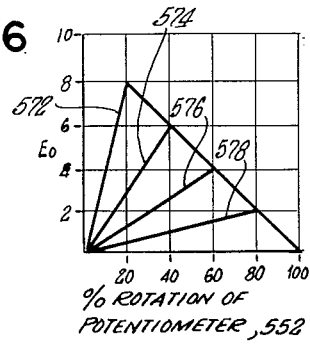
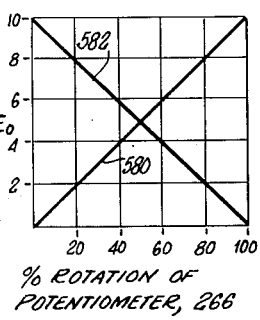
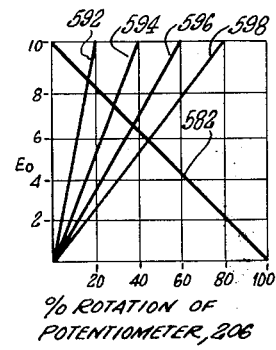

Aug. 1, 1961 S. J. SKIRPAN 2,994,804
LIGHTING CONTROL SYSTEM
Filed June 17, 1957 8 Sheets-Sheet 3

INVENTOR.
STEPHEN JAMES SKIRPAN
BY
ATTORNEY

Aug. 1, 1961     S. J. SKIRPAN     2,994,804
LIGHTING CONTROL SYSTEM
Filed June 17, 1957     8 Sheets-Sheet 4
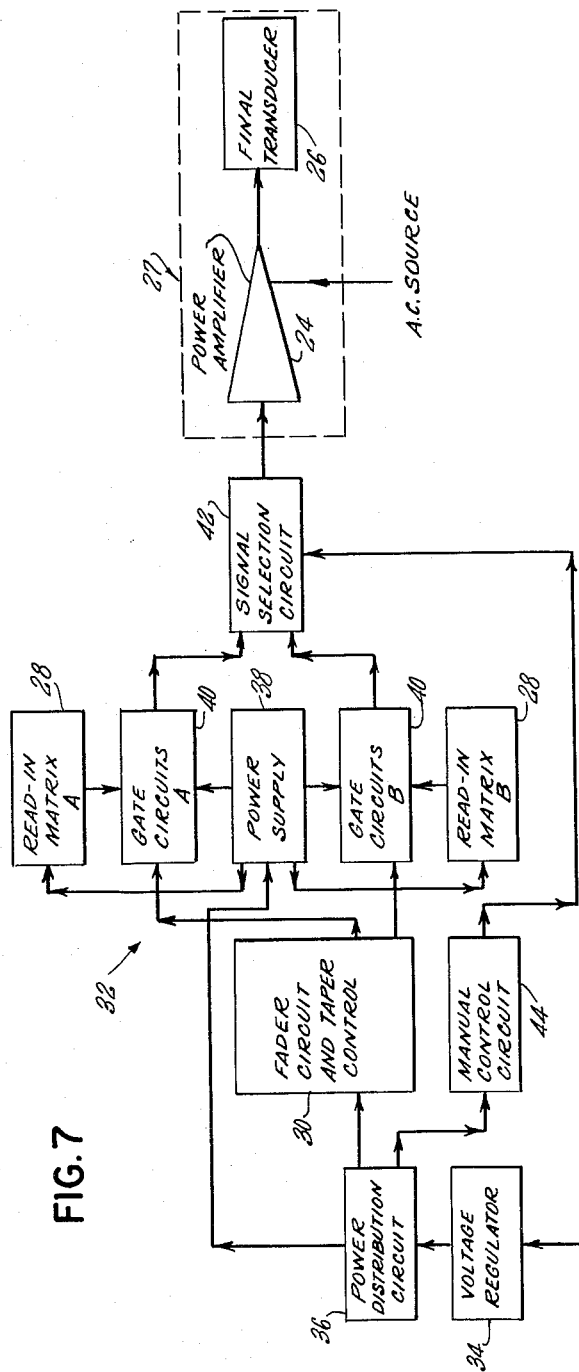
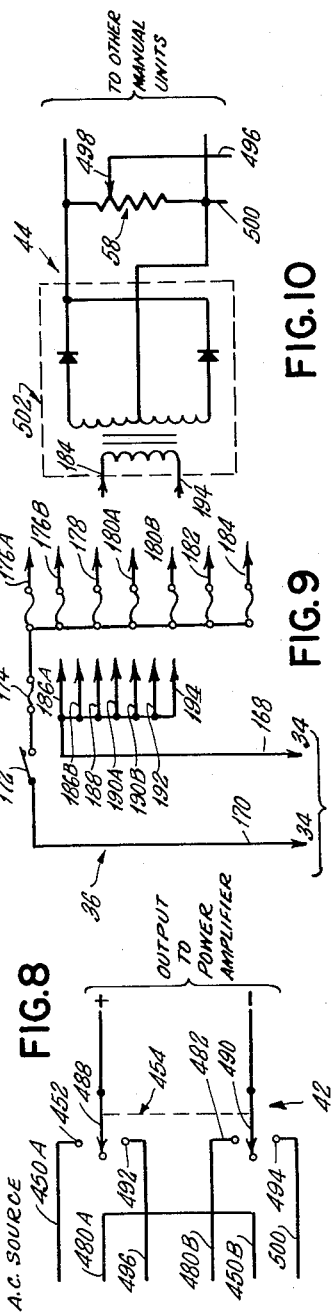
INVENTOR.
STEPHEN JAMES SKIRPAN
BY
ATTORNEY Aug. 1, 1961  S. J. SKIRPAN  2,994,804
LIGHTING CONTROL SYSTEM
Filed June 17, 1957  8 Sheets-Sheet 5
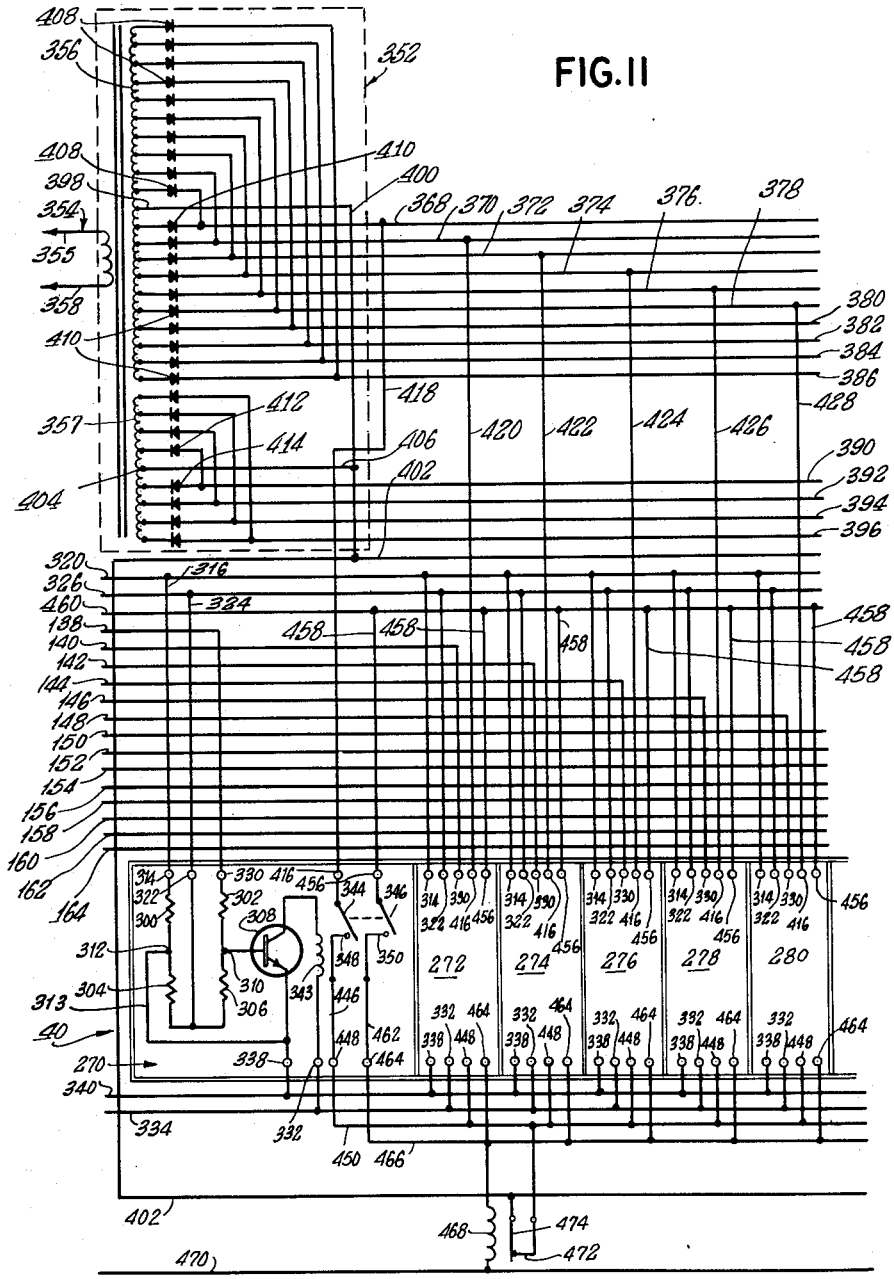
FIG.11
INVENTOR.
STEPHEN JAMES SKIRPAN
BY 
ATTORNEY Aug. 1, 1961
S. J. SKIRPAN
2,994,804
LIGHTING CONTROL SYSTEM
Filed June 17, 1957
8 Sheets-Sheet 6
FIG. 12
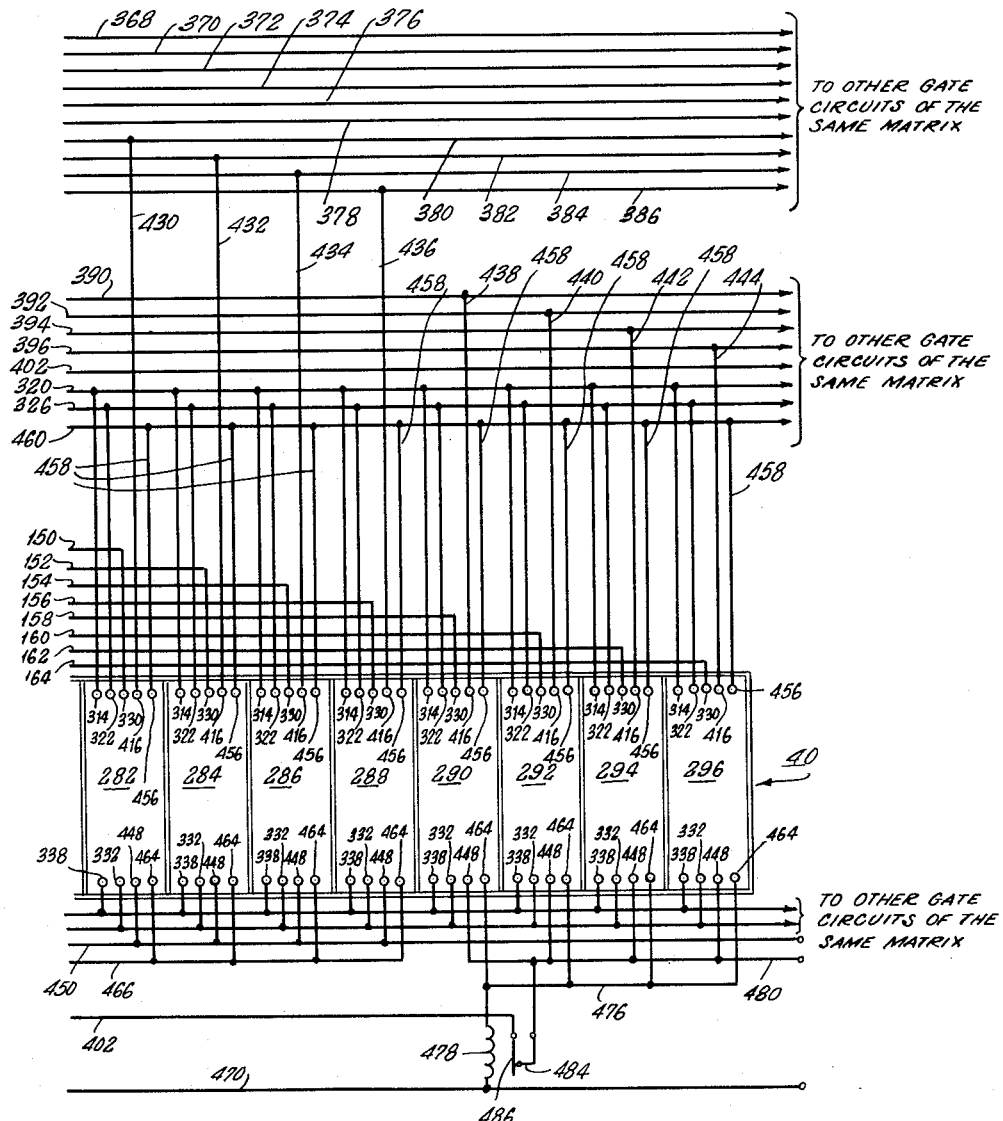
INVENTOR.
STEPHEN JAMES SKIRPAN
BY 
ATTORNEY Aug. 1, 1961  S. J. SKIRPAN  2,994,804
LIGHTING CONTROL SYSTEM
Filed June 17, 1957  8 Sheets-Sheet 8

INVENTOR.
STEPHEN JAMES SKIRPAN
BY
ATTORNEY

United States Patent Office 2,994,804
Patented Aug. 1, 1961

2,994,804
LIGHTING CONTROL SYSTEM
Stephen James Skirpan, New York, N.Y.
(34—15 Parsons Blvd., Flushing, N.Y.)
Filed June 17, 1957, Ser. No. 666,004
10 Claims. (Cl. 315—319)

The present invention relates to a lighting control system for use especially in the control of lighting for theatrical stages, television studios and similar places.

The prior art utilized a number of different systems in attempting to provide a satisfactory lighting control system. An early system utilized banks of large variable resistors in series with incandescent lamps for the purpose of controlling the intensity of said lamps. In addition to other disadvantages, there was the important disadvantage in this system pursuant to which only two circuits could be effectively controlled by a single operator in a change involving numerous circuits traveling to various intensities simultaneously.

The variable resistor was replaced by the variable autotransformer. It was still impossible for a single operator to control more than a few circuits in a complex proportional change.

Most recently there have been used thyratron and magnetic power amplifier systems which control the effective current to the lamp loads and thereby their intensity. The power gain of these systems permits many kilowatts of lamp load to be controlled by a few watts of signal power. These systems utilize a crude and limited memory storage, known in the art as "presetting," by which signal potentiometers were duplicated for storage purposes. However, this system was extremely limited in storage and therefore required the resetting of thousands of potentiometers during a typical one hour television presentation. It also presented the problem of parallax. It was not adaptable to preset light variables, such as color or focus, and was limited to a linear "fade" in changing from one preset to another.

In view of the foregoing, it is an object of the present invention to provide a lighting control system which obviates the disadvantages of the prior art systems.

Another object of the present invention is to provide a lighting control system which is capable of substantially limitless storage or presetting.

Another object of the present invention is to provide a lighting control system which can be used to activate any suitable power amplifier for the purpose of controlling the intensity of lamps or for the control of any suitable servomechanism for controlling the other variables of light, such as color, focus, spread, matting, load switching or position.

Another object of the present invention is to provide a control console which fulfills the foregoing objects and which, nevertheless, is small and compact in construction and simple in operation.

Another object of the present invention is to provide a lighting control system having provision for substantially limitless memory storage and capable of the "read-out" or functional translation of preview and active storage group or presets.

Another object of the invention is to provide a lighting control system having infinite memory storage capacity and capable of fast "read-in" or establishment of the memory data for each desired lighting arrangement.

Still another object of the present invention is to provide a lighting control console with substantially limitless memory storage capability, which utilizes definite quantities for storage and does not suffer from the problems of parallax in the method of storage or the danger of inaccuracies due to jarring, jolting or similar disturbances.

A further object of the invention is to provide a lighting control system with substantially limitless memory storage capacity and capable of fast changes in the programming of storage groups or presets or in the "bit" information within the presets.

A still further object of the invention is to provide a lighting control system which is capable of changing the linearity of a fade between storage groups in a negative or positive direction.

Yet a further object of the present invention is to provide a highly novel and efficient permanent record of a preset for a light variable, or the like, which record can be used as frequently as desired to exactly duplicate the preset in each instance of the use of such record.

The foregoing and other objects and advantages of the lighting control system of the present invention will become more apparent to those skilled in the art from the embodiment thereof more or less diagrammatically shown in the accompanying drawings and from the related description following. It is to be understood, however, that such embodiment is shown by way of illustration only, to make the principles and practice of the invention more readily comprehensible, and without any intent of limiting the invention to the specific details therein shown.

In the drawings:

FIG. 4 is a section, on an enlarged scale, taken either on line 4A—4A or on line 4B—4B, in FIG. 1;

FIG. 5 is a sectional view, on an enlarged scale, taken on line 5—5 of FIG. 4;

FIG. 7 is a block diagram of a lighting control system pursuant to the present invention, for controlling one light control circuit;

FIG. 8 illustrates the signal selection circuit;

FIG. 9 illustrates the power distribution circuit;

FIG. 10 illustrates the manual control circuit;

FIGS. 11 and 12 illustrate the gate circuits for each translation device, with parts omitted;

FIGS. 16, 17, and 18 are graphs illustrating characteristic operating values of certain components of the present invention.

Figure 1:
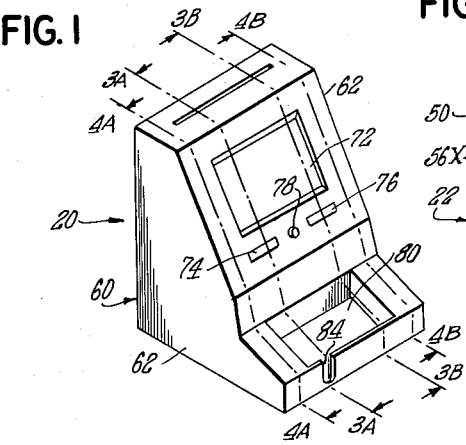
FIG. 1 is a perspective view of a "read-out" or translation device pursuant to the present invention.
Figure 6:
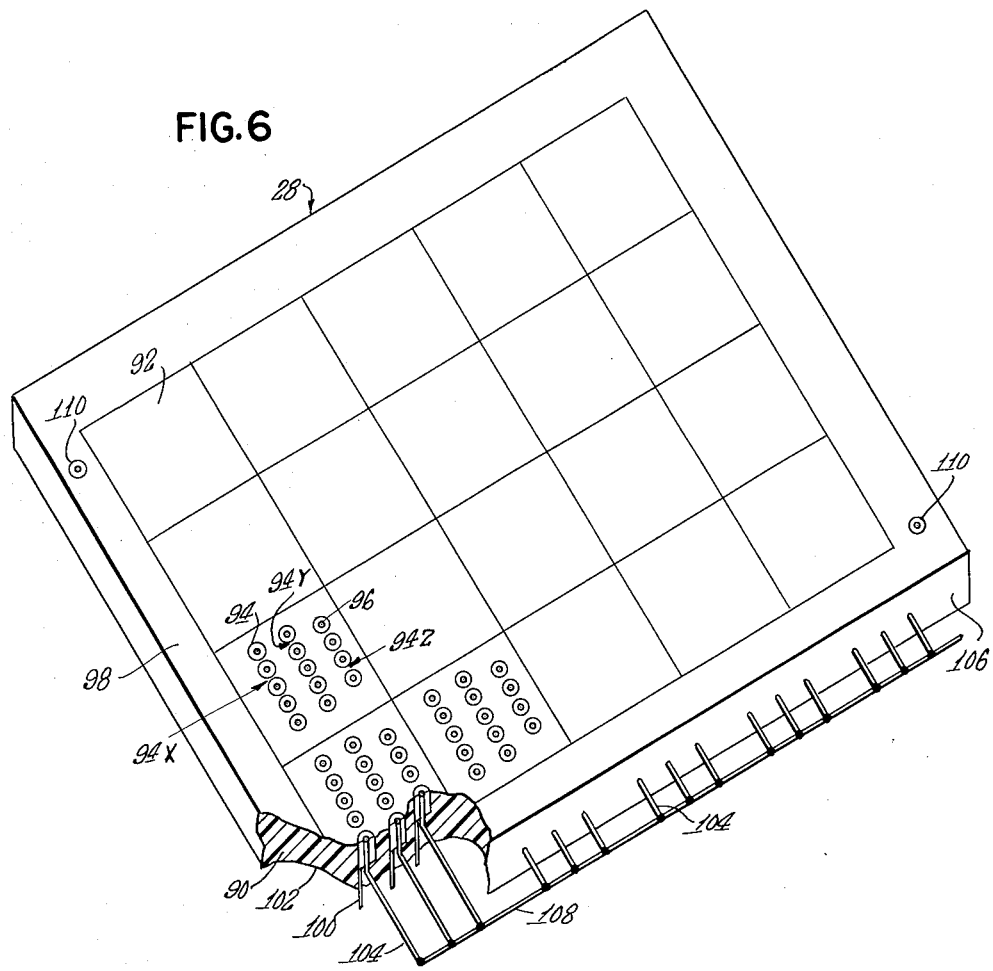
FIG. 6 is a plan view of the matrix provided in the translation device; a portion thereof being broken away for purpose of illustration.

Briefly described, the present invention utilizes a pair of "read-out" or translation devices 20 (FIG. 1), to receive cue cards or members 22 (FIG. 2) provided with preset control indicia or storage information to control the intensity or other characteristics or variables of lighting circuits through the operation of a conventional power amplifier 24 (FIG. 7) and a conventional transducer 26, which together constitute the control mechanism 27 for the associated lighting control circuit. Each device 20 is provided with a translation matrix 28 (FIG. 6).

The arrangement is such that the cards 22 may be successively inserted into the translation devices 20, one of which devices is in operative condition while the other is in inoperative or standby condition; provision being made to alternate the control of the system from one to the other of the translation devices, as successive lighting effects or presets are required.

Each memory device 22 has provision to control a plurality of lighting circuits, and to provide any one of a plurality of different intensity possibilities for the light source associated with each circuit. As is well known to those skilled in the art, the term "fade" or "cross fade" is the proportionate change from one preset lighting condition to another. In the present system, the alternation in the control of the system between the translation devices is provided by a fader taper control and circuit 30 (FIGS. 7 and 14), which provides a proportionate or linear fade between the change of control from one to the other of the translation devices 20, as determined by the presets or cards 22, the fader circuit also having provision to provide for a non-linear fade or transition in the light sources as the control shifts between the translation devices. Provision is also made for manual control of the power amplifier 24 for testing or manual operation.

A block diagram of the control system of the present invention, generally designated by the reference numeral 32, is shown in FIG. 7. Input from a suitable A.C. source is supplied through a conventional voltage regulator 34, to a power distribution circuit 36 (FIG. 9). The latter supplies the regulated voltage to the fader circuit 30 and to a power supply 38 (FIG. 15), which supplies the power to the matrices 28 of the two translation devices 20, respectively; said translation devices being hereinafter individually distinguished and referred to as translation device 20A and translation device 20B, and their associated matrices being similarly differentiated and identified as 28A and 28B, respectively. In the following description, the designation "A," in connection with a reference numeral indicates, in each case, a circuit, component, part, etc., associated with the matrix 28A, while the designation "B" indicates the corresponding part associated with the matrix 28B. Where no letter is used with a reference numeral, the circuit, component, part, etc., to which it refers is the same for each matrix.

Each of the matrices 28A and 28B controls a series of similar associated gate circuits 40 (FIGS. 11 and 12), subject to the control of the fader circuit 30; the corresponding gate circuits being hereinafter referred to as 40A and 40B. A signal selection circuit 42 (FIG. 8) is energized by gate circuits 40A and 40B, depending upon the setting or condition of the fader circuit 30, and may be alternatively energized or operated under the control of a manual control circuit 44 (FIG. 10) for manual operation of the light sources in lieu of the operation thereof in response to the cards 22.

The operating signals for the power amplifier 24 are supplied through the signal selection circuit for operating the transducer 26 which, in the instance of light intensity control, would be a series of associated lamps. While a power amplifier 24 is shown herein for the control of light intensity, it will be understood that it is within the scope of the present invention to control the operation of servomechanisms or other control mechanisms through amplifiers or relay devices in lieu of the lamp loads so as to regulate or control other variables of the light sources, such as for example, and not by way of limitation, color, focus, position, movement, matting or load switching, utilizing an appropriate card 22 for storing or presetting the appropriate information.

Figure 2:
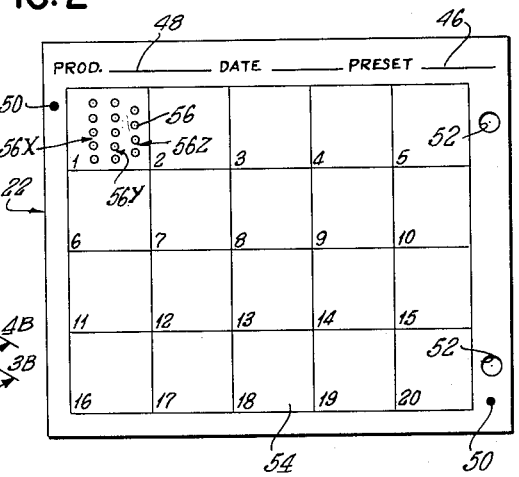
FIG. 2 is a front view of a "read-out" or cue card for use with the translation device of the invention.
Figure 3:
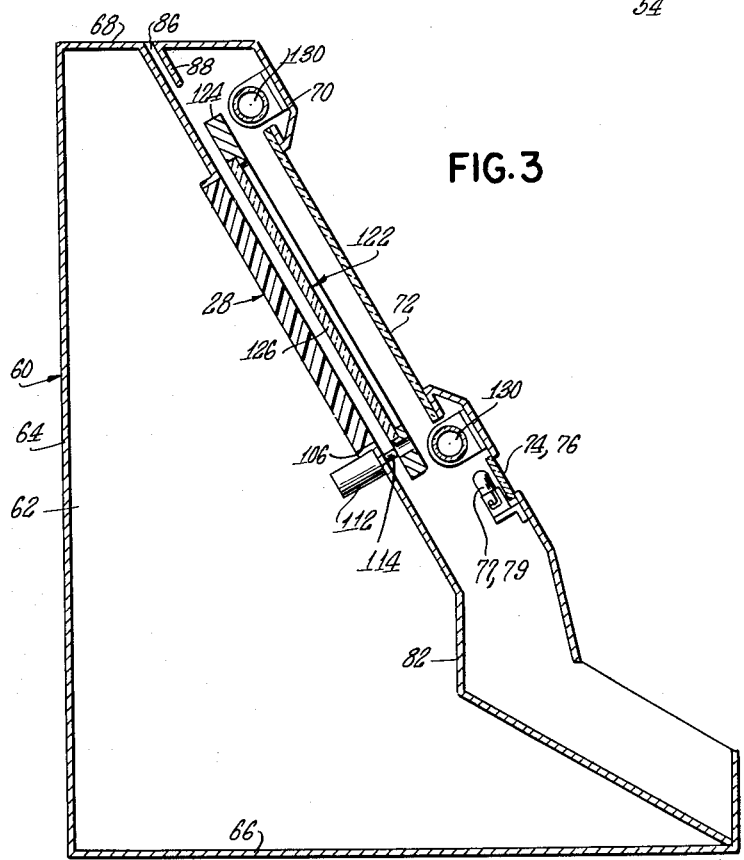
FIG. 3 is a section, on an enlarged scale, taken either on line 3A—3A or on line 3B—3B in FIG. 1.

Referring now to the drawings in detail, a "read-in" cue card or information storage preset 22 is shown in FIG. 2. Each such card 22 is intended to represent a preset or storage group for a particular scene in a production and may be marked by the lighting designer, as at 46, to identify the scene, and, as at 48, to identify the production. Each card 22 is formed of suitable translucent sheet material and is provided with the permanently opaqued diagonally related spots 50, the function of which will hereinafter appear, and with the filing apertures 52. The card 22 is ruled to provide a plurality of marking areas 54, thereon corresponding to the number of lighting circuits that are to be controlled. As here shown, provision is made for a twenty area card, to control a twenty circuit light bank installation; each area being numbered for allocation to a particular control circuit. It will be understood that the card 22 may be provided with a greater or lesser number of areas 54, to accommodate a greater or lesser number of circuits.

In order to control the intensity of any circuit represented by an area 54 on the card 22, the lighting designer need only indicate the required intensity information in the particular area. In the present embodiment of the invention, each area or square 54 is provided with fourteen circles, 56, as shown in the square numbered 1; said circles having been omitted from the other squares in the drawing for purposes of simplification. The circles 56 are arranged in three lateral rows, with five circles in each of two rows 56X and 56Y and four circles in the third row 56Z. The circles in rows 56X and 56Y represent the principal digits, one (1) through ten (10), in steps of one whole digit. The four circles in row 56Z represent secondary digits or decimal portions of a whole digit, from 0.2 to 0.8, in steps of two tenths of a digit. The lighting designer decides the intensity of a given circuit by merely filling in the appropriate circles with a common lead pencil or crayon, so that when the card is "read-out" or translated in a translation device 20, each circuit corresponding to a square 54 will assume the intensity directly proportional to the sum of the principal and secondary digits that are blacked in.

In the example illustrated in FIG. 2, there are forty-four (44) intensity possibilities for each circuit, ranging in steps of two tenths (.2) from 0.2 to 10.8. The resolution in step function at the lamps controlled by the various circuits would be 2.6 volts or 2.2% assuming a 115 volt maximum. However, it is within the scope of the present invention to increase or to decrease the number of intensity possibilities or steps for each circuit so as to provide more or less than forty-four steps with the step resolution being accordingly changed in voltage or percentage, as will be readily understood. In making up his cue cards 22, the lighting engineer or designer may first set up the lighting manually for each circuit by use of the previously mentioned manual control circuit 44, which includes a control potentiometer 58 (FIG. 10) for each circuit; the setting of each potentiometer then being recorded in the corresponding control area of the cue card. Since a lead pencil is used to fill in the circles 56, it will be apparent that filled-in circles may be erased at any time during a rehearsal and other circles filled in to change the intensity of the light source controlled by the particular circuit. At the end of a performance, the pencilled circles may be inked to provide a permanent record for use when the performance is to be repeated.

As previously indicated, in accordance with the illustrated embodiment of the invention, two translation devices are provided for translating the storage information on the cue cards 22, with one device 20A being operative while the other device 20B is inoperative or in stand-by condition, with provision to alternate control from one to the other of said devices as the performance proceeds. Referring now to FIGS. 1 and 3 through 6 in detail, it will be noted that each suitable device 20 comprises a suitable housing enclosure 60 having opposing side walls 62, a rear wall 64, a base, 66, a top wall, 68, and a front wall, 70. The front wall 70 is provided with a viewing window, 72, and with translucent strips, 74 and 76, backed by the pilot lights, 77 and 79 respectively. Strip 74 is marked "Active" and strip 76 is marked "Preview," and the energization of the associated pilot lights 77 and 79, as hereinafter described, denotes the condition of the translation device as operative or inoperative, respectively. A card release button 78 is mounted between the strips and functions in a manner hereinafter described. A cue card receiving tray or receptacle 80 is also defined by the front wall and an underlying baffle or inner wall 82; said tray including a finger slot 84 to facilitate the removal of the cards. The baffle 82 extends from the bottom wall to the top wall; the latter having a card insert slot 86 defined therein adjacent said baffle, and a depending guide flap 88.

The previously mentioned matrix 28 (FIG. 6) is suitably mounted by the baffle 82. Such matrix is constituted by a sheet 90 of dielectric material which, as here shown, has twenty areas or squares 92 defined thereon, which correspond with the twenty areas 54 of the cue cards 22. Each area is provided with fourteen photo-electric elements 94 arranged in three rows, 94X, 94Y and 94Z, for registry with the three rows of circles 56X, 56Y and 56Z, respectively, in the corresponding square of the cue card, so that fourteen of said elements 94 are provided for each control circuit. The photo-electric diodes are preferably molded into the dielectric member 90 and are preferably of the germanium or lead sulfide type; being commercially available in molded assembly with the dielectric member. The photo-sensitive area or electrode 96 of each photo-diode is at the upper surface 98 of the matrix 28. One lead 100 from each diode extends from the lower surface 102 of the matrix and the other lead 104 extends from the edge 106 of the sheet 90 for connection to a common bus 108. Each matrix is also provided with a pair of diagonally related photo-diodes 110–110 outside the control areas 92 for registry with the opaque circles 50, respectively, of the cue card.

The baffle 82 also mounts a pair of laterally spaced solenoids 112 immediately below the bottom edge 106 of the matrix, as best seen in FIG. 5. The solenoids are each provided with a plunger 114 (FIG. 3) spring loaded internally of the solenoid which in projected position, as shown is the unenergized condition of the solenoid and which is withdrawn or retracted when the solenoid is energized. The plungers 114 constitute positioning detents for the cue cards, as hereinafter explained.

The baffle 82 also mounts four rectangularly related solenoids 116 outwardly of each of the corners of the matrix 28. Each solenoid 116 is provided with a plunger 118 on which there is mounted a compression spring 120. The plungers 118 mount a compression plate 122. As here shown, plate 122 is constructed of a frame 124 in which there is suitably mounted a transparent member 126 (FIG. 4); the latter overlying the front surface 98 of the matrix 28. The frame 124 is mounted adjacent the corners thereof, by the plungers 118; it being understood that the plate 122 is drawn toward the matrix, against the pressure of the springs 120, when the solenoids 116 are energized to clamp a cue card against the upper surface of the matrix, and is returned to its retracted, illustrated position by the expansoin of the contracted springs 120 upon de-energization of the solenoids 116.

In order to provide illumination for the translucent cue cards 22 and excitation for the photo-diodes, a pair of fluorescent lamps 130 are suitably mounted in the housing 60 between the baffle 82 and the front wall 70.

From the foregoing, it will be understood that a cue card 22, inserted into the housing 60 through the slot 86, will fall between the matrix and the pressure plate 122 until it engages the detent plungers 114 which extend into the path of movement thereof. The size of the slot 86 positions the card in a horizontal direction. When the card is stopped by the detent plungers, its two permanently opaqued portions 50 are in overlying registry with the two positioning photo-diodes 110, respectively, of the matrix. This activates two gating circuits 132 (FIG. 13), hereinafter described in detail, which in turn energizes the four solenoids 116 to cause the pressure plate 122 to clamp the card in position against the matrix. After use, the clamped card is released by operating push button 78 to retract the detents 114 and to release the pressure plate 122 from its clamping position, as hereinafter explained in detail; the released card falling into the tray 80.

Figure 15:
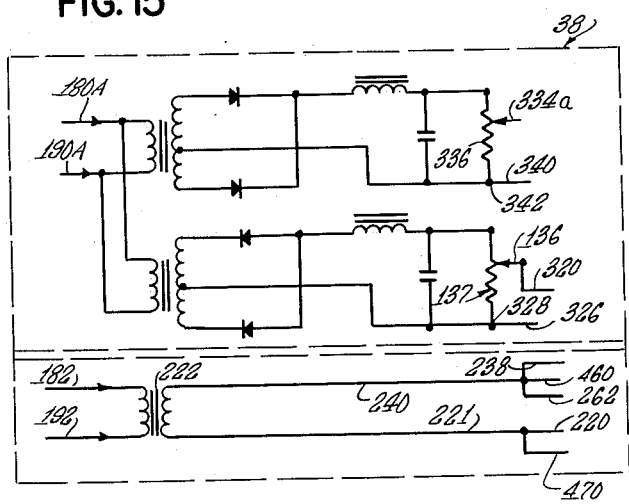
FIG. 15 is the wiring diagram for the power supply circuit.
Figure 13:
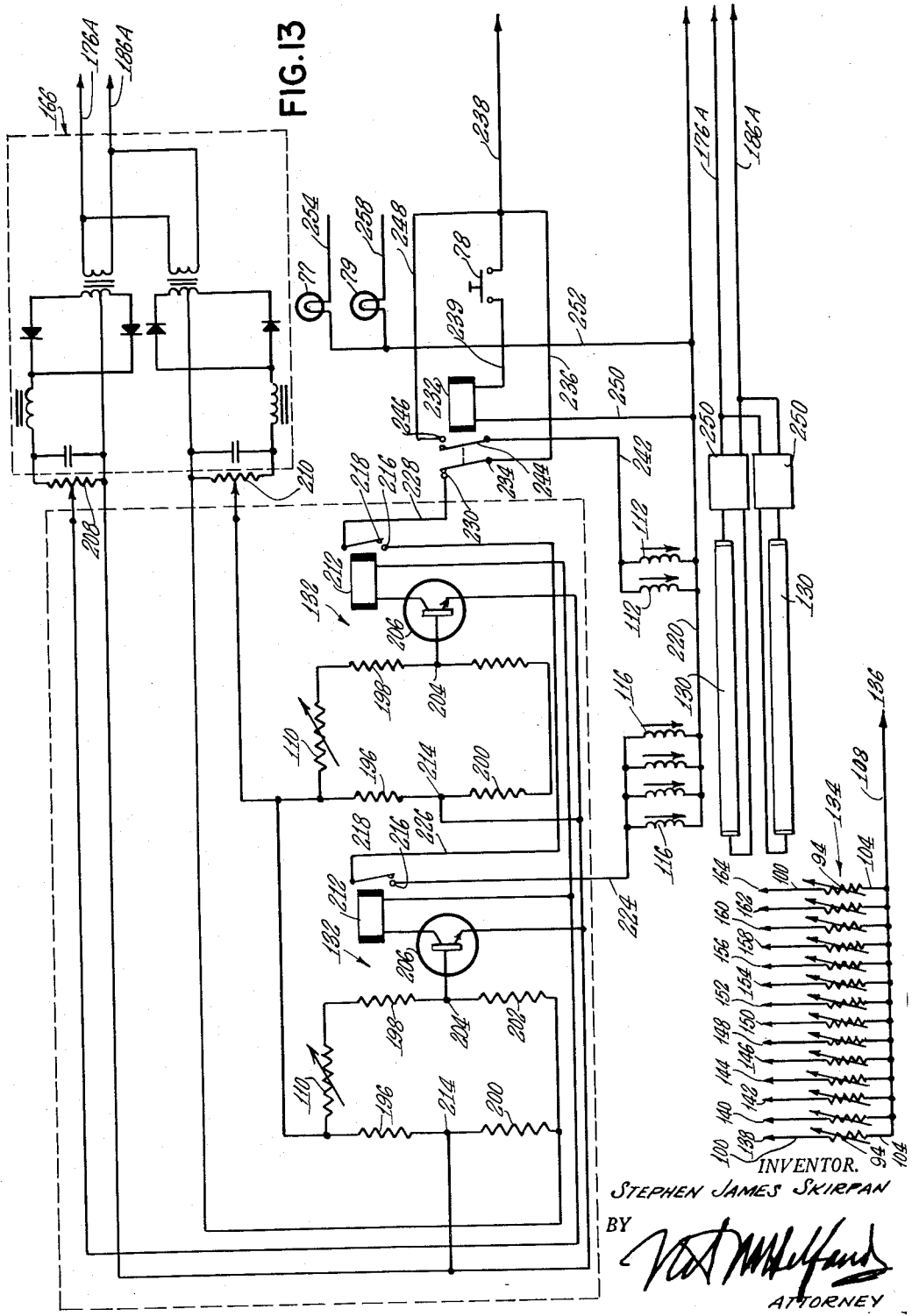
FIG. 13 is the wiring diagram for the circuit of each translation device.

Referring now to FIG. 13 in detail, there is illustrated therein the circuit associated with the matrix 28 in one of the translating devices 20. The fourteen photo-diodes 94 in one control square of the matrix for one light control circuit are illustrated by the group 134, of variable resistances 94, connected by leads 104 and common bus 108 to the tap 136 of output potentiometer 137 in the conventional, full wave power supply 38 (FIG. 15). The other leads 100 of the variable resistances 94 are connected by the leads 138, 140, 142, 144, 146, 148, 150, 152, 154, 156, 158, 160, 162 and 164 to the associated gate circuits in FIGS. 11 and 12. It will be understood that all of the groups 134 of the photo-electric devices 94 are similarly connected between the power supply and their associated gate circuits; said arrangement being similar for each of the two translation devices 20A and 20B.

Each of the positioning diodes 110 of a matrix energizes a gating circuit 132. Filtered, full wave, direct current for said gating circuits 132 is supplied by the conventional power supply 166 which is energized from the power distribution circuit 36 (FIG. 9).

Regulated voltage from the voltage regulator 34 is supplied to the distribution circuit through the supply lines 168 and 170; the latter having an On-Off switch 172 and being suitably fused, as at 174. Line 170 is provided with the fused distributor lines 176A, 176B, 178, 180A, 180B, 182 and 184. Line 168 is provided with the distribution lines 186A, 186B, 188, 190A, 190B, 192 and 194. Lines 176A and 186A supply the input to power supply 166 for the gate circuits 132 of matrix 28A. Lines 176B and 186B provide the same function for the power supply 166 associated with the matrix 28B. Lines 180A and 190A supply the input for power supply 38 (FIG. 15) for the circuits of the device 20A and lines 180B and 190B serve the same function for device 20B.

Each gating circuit 132 includes a bridge circuit comprising the resistors 196, 198, 200 and 202 with the photo-diodes 110 connected in series between the resistors 196 and 198. The junction 204 between resistors 198 and 202 is connected to the base of a transistor 206. The collector voltage of the transistor is adjusted by the potentiometer 208, and the base bias is adjusted by the potentiometer 210. A relay 212 is in the collector circuit of the transistor. The junction between the resistors 196 and 200 is indicated at 214. The bridge is balanced when light strikes the photo-diode 110. The internal resistance of the photo-diode is low and in this condition no potential appears across the junctions 214 and 204. However, when the photo-diode is darkened by a permanently opaqued area 50 of the cue card, the internal resistance of the photo-diode is increased to unbalance the bridge. In this condition, junction 204 goes positive and junction 214 goes negative to cause a current flow in the base circuit of its N-P-N transistor 206. This, in turn, causes an increase in the collector current to energize relay 212 and close the contacts 216, 218 thereby.

The four solenoids 116 are connected in parallel. One end of each solenoid 116 is connected through lines 220 and 221 to one side of the secondary winding of the low voltage transformer 222 in the power supply 38 (FIG. 15); the primary winding thereof being connected to the lines 182 and 192 of the power distribution circuit. The other end of each solenoid is connected through line 224 to stationary contact 216 of the left hand relay 212; the companion movable contact 218 being connected through line 226 to the stationary contact 216 of the right hand relay 212. The companion movable contact 218 of the latter is connected through line 228 to the stationary contact 230 of relay 232; the companion movable contact 234 being connected through lines 236, 238 and 240 to the other side of the secondary of low voltage transformer 222. Consequently, it will be apparent that the energization of both gate circuits 132, resulting from the superpositioning of photo-diodes 110 by the opaque circles 50 of the cue card 22, connects the solenoids 116 across the secondary of transformer 222 and causes them to operate the clamping member 122 to clamp the cue card against the matrix.

The two solenoids 112 are connected in parallel. One end of each solenoid 112 is connected to the line 220 and the other ends thereof are connected via line 242 to the movable contact 244 of relay 232; the companion stationary contact 246 being connected through line 248 to line 238. One terminal of relay 232 is connected through lead 250 to lead 220 and the other terminal is connected by lead 239 to the normally open push-button 78. Consequently, it will be apparent that when the push button 78 is depressed, the relay 232 is connected across the secondary of the transformer 222 and is energized to open at contacts 230, 234 and to close at contacts 244, 246. The opening of contacts 230, 234 interrupts the energizing circuit to solenoids 116 to permit retraction of the clamping member 122 by springs 120, to release the clamped cue card. The closing of the relay contacts 244, 246 completes the energizing circuit for the solenoids 112 across the transformer 222, so as to retract the plungers 114 and permit the cue card to drop into the tray 80.

The fluorescent lamps 130 and their associated ballasts 250 are connected to the lines 176A and 186A of the power distribution circuit 36. The previously mentioned pilot lights 77, 79 are each connected at one end through the leads 252 and 220 to one side of the secondary of transformer 222. Pilot light 77 is positioned behind the "Active" strip 74 and pilot light 79 is positioned behind the "Preview" strip 76. Pilot light 77 is connected through line 254 to one side of the switch 256 in the fader taper control circuit 30 (FIG. 14), and pilot light 79 is connected through line 258 to one side of the switch 260 in said circuit. The other side of each switch is connected through lines 262 and 240 to the other side of the secondary of transformer 222. The switches are ganged together and ganged to the arm 264 of the fader control potentiometer 266. With the arm 264 in position B, as illustrated, the translation device 20B is energized, as hereinafter explained in detail, so that its "Active" pilot light 77 is energized through the closed switch 256 and its "Preview" pilot light 79 is de-energized through the open switch 260. At this setting of arm 264, the other translation device 20A is de-energized, as hereinafter explained in detail; being in a "Preview" position until the arm 264 reaches its position A, to reverse the conditions of switches 256 and 260, to indicate that unit 20A is "Active" and unit 20B is in "Preview." Consequently, in the condition illustrated in FIG. 14, unit 20A is in "Preview" and a new card can be inserted therein.

The fourteen photo-diodes 94 in each area 92 of the matrix 28 control one light control circuit. The fourteen photo-diodes for each light control circuit provide the activating signal for fourteen associated gates or switching circuits 270, 272, 274, 276, 278, 280, 282, 284, 286, 288, 290, 292, 294 and 296, as shown in FIGS. 11 and 12. While these figures show only one set of fourteen gating circuits for one matrix area 92, it will be understood that a similar set of fourteen gating circuits is provided for the fourteen photo-diodes in each other area 92 of the matrix 22. Each gating circuit is similar to the previously described gating circuit 132. While the gating circuit 270 is the only one completely illustrated, it will be understood that each of the other gating circuits has a similar circuit and operates in the same manner, as hereinafter described.

Each photo-diode 94 is a partial leg of a bridge provided within its associated gating or switch circuit. The bridge is comprised of resistors 300, 302, 304 and 306. Each photo-diode 94 is in series with its associated resistor 302. For example, in the case of gating circuit 270, it will be noted that its associated photo-diode, shown as the variable resistance 94 at the extreme left in FIG. 13, is connected by lead 138 in series with resistor 302; the remaining photo-diodes being similarly connected in series with their associated resistors 302 through the evenly numbered leads 140–164, respectively. The base of transistor 308 is connected to junction 310 between resistors 302 and 306 and a junction 312 is located between resistors 300 and 304. This junction 312 is connected to the emitter of transistor 308 through lead 313. Negative bias is provided at terminal 314 which is connected via lead 316 to a common negative bias lead 320 extending from the tap 136 of power supply 38 (FIG. 15). Positive bias is provided at terminal 322 which is connected via lead 324 to a common positive bias lead 326 extending from the end 328 of the potentiometer 137 in the power supply 38. Since the associated photo-diode 94 is connected at one end to the tap 136 of the potentiometer 137 and at the other end to terminal 330, said photo-diode is effectively connected between terminals 314 and 330.

Utilizing resistance 302 in series with the photo-diode, the bridge is balanced so that no potential difference appears between the junctions 310, 312 when light strikes the diode and its internal resistance is relatively low. However, when the photo-diode is darkened by an opaque area of cue card, its internal resistance increases and the bridge is unbalanced. In this condition of the bridge, junction 310 goes positive and junction 312 goes negative. This causes current flow in the base circuit of N-P-N transistor 308. Positive collector voltage is applied to the transistor circuit through terminal 332 which is connected to the common positive voltage line 334 which extends from the tap 334a of the potentiometer 336 of the power supply 38. Negative return is applied through terminal 338 which is connected to the common return lead 340 extending from the end terminal 342 of the power supply potentiometer 336. A relay 343 is in the collector circuit of the transistor 308. When current flows in the base circuit of the transistor, the collector current increases and causes the ganged movable contacts 344, 346 to engage their associated stationary contacts 348, 350. It will be obvious, therefore, that whenever an opaqued or pencilled circle on the cue card interrupts the light to the underlying photo-diode, its associated gating circuit closes. All the gating circuits are similar and operate in the same manner.

Figure 14:
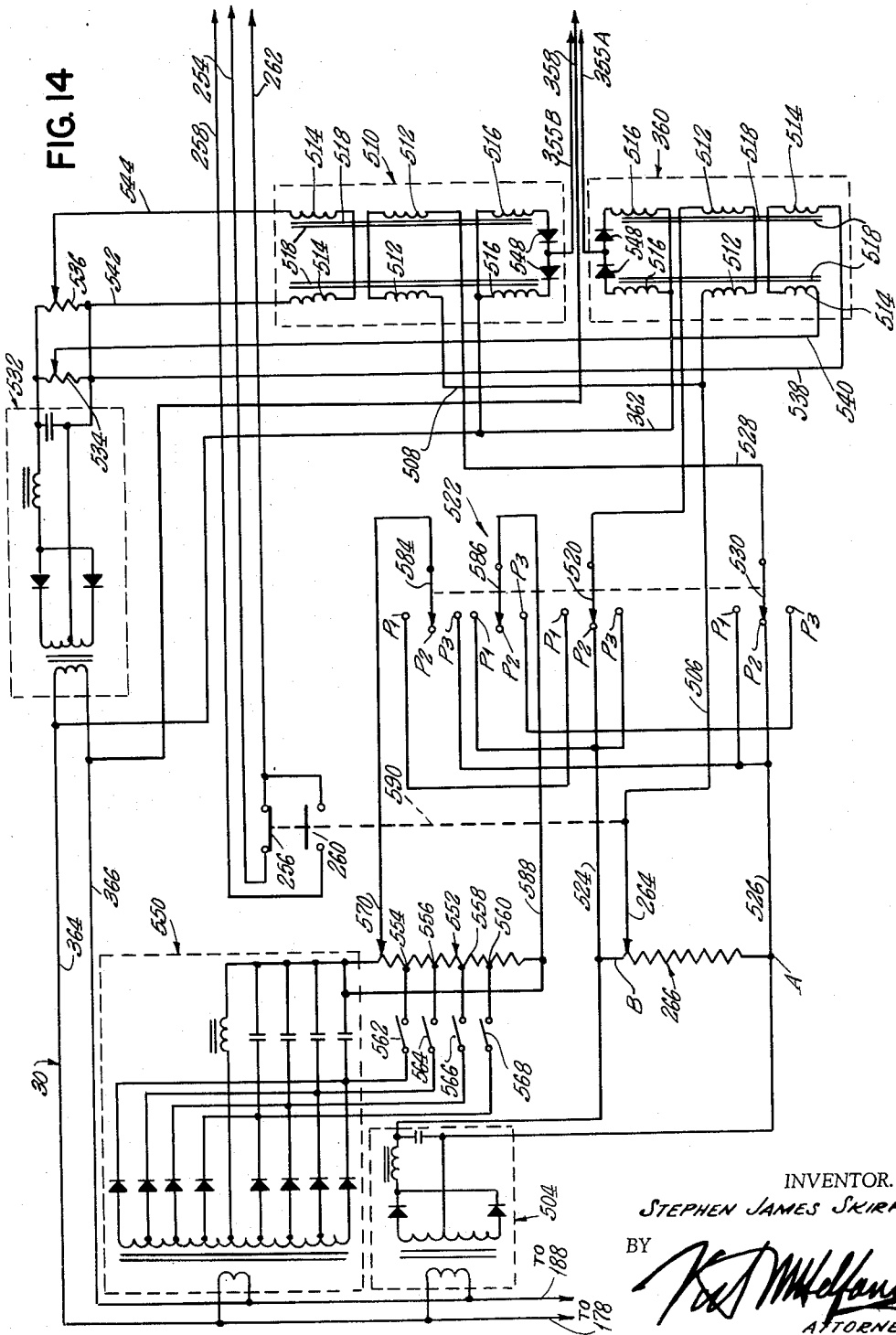
FIG. 14 is the wiring diagram for the fader circuit.

Provision is made for a full wave D.C. power supply 352 from which the various gate circuits select voltages for application to the associated power amplifier 24 to control the associated light control circuit. The power supply 352 includes a primary winding 354 and the secondary windings 356 and 357. The primary 354 is connected at one end to lead 355 through the magnetic amplifier 360 of the fader control circuit 30 and thence through lines 362 and 364 to tap 178 of the power distribution circuit 36 (FIGS. 9 and 14). The primary 354 is connected at its other end through lead 358 to lead 366 and through the latter to tap 188 of the power distribution circuit. The secondary winding 356 supplies the ten principal digit voltage buses, 368, 370, 372, 374, 376, 378, 380, 382, 384 and 386. The secondary winding 357 supplies the four secondary digit voltage buses, 390, 392, 394 and 396. The primary and secondary voltage buses provide signal voltages of different values, respectively, for the control mechanism 27.

It will be noted that the secondary winding 356 for the principal digit voltage buses is center tapped, as at 398, and the center tap is connected by lead 400 to the common line 402. Similarly the secondary winding 357 for the secondary digit voltage buses is center tapped at 404 and is connected by lines 406 and 400 to the common line 402. Each principal digit bus is connected through a pair of selenium rectifiers 408, 410 to a pair of taps, respectively, at opposite sides of the center tap 398. Similarly, each secondary digit bus is connected through a pair of rectifiers 412, 414 to a pair of taps, respectively, at the opposite sides of the center tap 404.

The movable contact 344 in each gate circuit is connected to a terminal 416. The principal voltage bus 368 is connected through lead 418 to terminal 416 of gate circuit 270. Terminal 416 of circuit gate 272 is connected by lead 420 to bus 370. Terminal 416 of gate circuit 274 is connected by lead 422 to bus 372. Bus 374 is connected by lead 424 to terminal 416 of gate circuit 276. Bus 376 is connected by lead 426 to terminal 416 of gate circuit 278. Bus 378 is connected by lead 428 to terminal 416 of gate circuit 280. Bus 380 is connected by lead 430 to terminal 416 in gate circuit 282. Bus 382 is connected by lead 432 to terminal 416 in gate circuit 284. Bus 384 is connected by lead 434 to terminal 416 of gate circuit 286. The final principal digit bus 386 is connected by lead 436 to terminal 416 of gate circuit 288.

The secondary digit buses are connected in the same manner to the four secondary digit gate circuits 290, 292, 294 and 296. Bus 390 is connected through line 438; bus 392 through line 440; bus 394 through line 442; bus 396 through line 444; as indicated in FIG. 12. Both the principal digit and the secondary digit voltage buses extend from the associated power supply 352 in the same manner to all the open gate circuits associated with the matrix 28A or 28B, as the case may be.

The stationary relay contact 348 in each of the principal digit gate circuits 270 to 288, respectively, is connected through a lead 446 to a terminal 448 which is connected to a common positive output bus 450. In the case of the matrix 28A, bus 450, as shown at 450A in FIG. 8, extends to contact 452 of the ganged selector switch 454 of the signal selection circuit 42. In the case of the matrix 28B, the corresponding bus 450 is connected into the signal selection circuit, as shown at 450B in FIG. 8.

The movable relay contact 346 in each gate circuit is connected to terminal 456 thereof, which is connected by an associated lead 458 to the common line 460 which extends from the lead 240 of the transformer 222 in the A.C. section of the power supply 38 (FIG. 15). The associated stationary relay contact 350 is connected by the line 462 to the terminal 464. All the terminals 464 of the principal digit gate circuits 270 through 288, respectively, are connected to a common line 466. A relay coil 468 is connected between line 466 and a line 470, which extends from the line 221 in the A.C. section of the power supply 38. The stationary contact 472 of said relay is connected to the common positive output bus 450. The companion movable contact 474 is connected to the common line 402 which is connected to the center taps of secondaries 356 and 357. All of the terminals 464 of the secondary digit gate circuits 290 through 296 respectively are connected to the line 476. One end of a relay coil 478 is connected to line 466 and the other end thereof is connected to line 470. The terminal 448 in each of the secondary digit gate circuits 290 through 296, respectively, is connected to a common negative output bus 480 which, in the case of the matrix 28A, is connected to the bus 450B of the matrix 28B in the selector circuit 42 (FIG. 8). In the case of the matrix 28B, the corresponding bus 480B is connected to the stationary contact 482 of the ganged selector switch 454.

The gate circuits 270 through 296 are operated to select voltage buses from the full wave D.C. power supply 352. The ten principal digit buses evenly numbered 368 to 386, respectively, are supplied by the secondary winding 356 and the four secondary digit buses evenly numbered 390 to 396 are supplied by the secondary winding 357. It will be noted from the connection of the associated rectifiers that the polarity of the principal gate master buses is opposite to the polarity of the secondary gate master buses. Further, it will be apparent that for the principal digit buses, the minimum voltage is available at bus 368 and increases in fixed increments to a maximum voltage at bus 386. For the secondary digit buses, the minimum voltage is available at bus 390 and increases in fixed increments to a maximum voltage at the bus 396.

If the output of a principal digit bus only is required, the circle in one of the rows 56x or 56Y on the cue card 22, for the associated lighting circuit, which circle corresponds to the required voltage, is darkened, so as to remove the light from the photo-diode which is associated with the gate circuit for the particular voltage bus, whose output is required. For example, assuming that the voltage at bus 368 is to be applied to a particular light control circuit, then the circle over the photo-diode connected to line 138 is darkened. This causes the relay 342 in gate circuit 270 to be energized to close its associated paired contacts. The engagement of contacts 344, 348 connects the voltage bus 368 to the common positive output bus 450 to provide voltage at the associated selector switch 454 for application to the associated power amplifier 24 and energizes associated transducer 26 in accordance with the associated light control circuit.

The energization of the relay also closes its contacts 346, 350, causing the relay 468 to be energized by connection across transformer 222. The normally closed contacts 472, 474 of relay 468 are thereby opened. The relay contacts 472, 474 are used as a return for the secondary digit voltage when only a secondary digit is commanded; for example, on a command for one of the secondary digits 0.2, 0.4, 0.6, or 0.8. The closed contacts 472, 474 effectively bypass the principal digit outputs by connecting the center taps of power supply 352 to the output bus 450. However, if any principal digit is commanded by the cue card, a principal digit gate circuit relay 342 is energized to energize relay 468 and open its contacts.

Consequently, if only a principal digit is called for by the cue card, the associated principal digit gate circuit operates to select the voltage from the associated principal digit voltage bus and applies said voltage to the common output bus 450. In this situation, return is accomplished through the center tap of the secondary winding 357 in the power supply 352 and the closed contacts of relay coil 478 to bus 480. It will be noted that its stationary contact 484 and its movable contact 486 are connected, respectively, to bus 480 and line 402. If only a secondary digit is commanded, the associated signal voltage is selected by the associated secondary gate circuit and applied to bus 480 by the engaged contacts 344, 348 of the associated relay 342. The other set of contacts 346, 350 of said associated relay closes and effects the opening of the normally closed contacts 484, 486 of relay 478. The return in this instance is through the closed contacts 472, 474 of relay 468 to bus 450. Since the polarity of the principal gate master buses is opposite to the polarity of the secondary gate master buses, the output does not change in polarity in either command situation.

If both principal and secondary digits are commanded, the contacts of both relays 468 and 478 open and the scondary signal voltage is in series with the principal signal voltage, so that the output voltage is the sum of the two voltages. If no signal is commanded for a particular light control circuit, the contacts of both relays 468 and 478 remain closed and bus 450 is shorted to bus 480.

Regardless of the condition of the gating circuits, no output voltage is supplied therefrom if the associated power supply 352 is not energized. As previously indicated, two translating devices 20A and 20B are utilized. They are alternately in an active or operating condition and in an inoperative or "preview" condition, depending on the condition of the fader control 266 (FIG. 14), which controls the energization of their associated gating circuit power supplies 352. If the rotor 264 of the fader control is in position B, as shown, the power supply 352 associated with the translating device 20A is de-energized and said device is in a preview condition or in inoperative condition. A cue card 22 can then be inserted into the device 20A without causing a signal output therefrom. When the fader control arm 264 is moved to position A, the power supply 352 associated with device 20A is progressively energized and an output signal voltage is produced. With the arm in position A, a cue card may be inserted in the device 20B. The output voltage progressively changes to the signal situation called for on the card in device 20B, when the fader arm is moved to position B. By reference to FIG. 8, it will be noted that the signals from the gating networks for each light control circuit associated with the translating device 20A and 20B, respectively, are in series relation, since bus 480A is connected to bus 450B. This provides for the proportionate fade between the preset or inoperative conditions of the two translating devices. The outputs from the two gating networks for each light control circuit are always series adding. The selector switch 454 for each light control circuit has three positions. When the movable contacts 488, 490 engage the stationary contacts 452, 482, respectively, the light control circuit is energized from its associated gating circuits. In the intermediate position of switch 454, as illustrated, the light control circuit is de-energized. When the switch arms 488, 490 engage the stationary contacts 492, 494, respectively, the light control circuit is energized from its associated manual control circuit 44.

Contact 492 is connected through line 496 to the arm 498 of the control potentiometer 58 and contact 494 is connected through line 500 to the bottom end of the potentiometer. The potentiometer is connected across the full wave D.C. power supply 502. The power supply is energized by connection of its primary winding to the taps 184 and 194 of the distribution circuit 36. It will be understood that all the control potentiometers 58 for each of the light control circuits are connected in parallel across the power supply 502, as shown. The potentiometer 58 is graduated in steps corresponding to the previously described steps on the cue cards, whereby each light control circuit can have its intensity manually set by positioning the arm 498 of its associated potentiometer 58 to the required step on the potentiometer.

Referring now to FIG. 14 in detail, there is illustrated the fader circuit and taper control, generally indicated by the reference numeral 30. The fader circuit includes a filtered, full-wave D.C. power supply 504, having its input connected to the taps 178, 188 of the distribution circuit 36. The fader control potentiometer 266 is connected across the output of the power supply. The movable arm 264 of potentiometer 266 is connected by the lead 506 to the previously mentioned magnetic amplifier 360 and by leads 506 and 508 to a magnetic amplifier 510. Each amplifier has a pair of control windings 512, a pair of bias windings 514 and a pair of output windings 516. The cores are indicated at 518.

The control windings 512 of amplifier 360 are connected between the lead 506 and one arm 520 of a fader function switch 522 so that in the illustrated condition of the switch, the arm is connected to the positive voltage lead 524 from the power supply 504 to provide a negative signal input to the magnetic amplifier 360. The control windings 512 of magnetic amplifier 510 are connected between the potentiometer arm 264, as previously described, and the negative power supply lead to which the lower end of the potentiometer is connected through the load 528 and a second arm 530 of switch 522, in the illustrated condition thereof. Consequently, it will be apparent that when arm 264 is at the lower or "A" end of the potentiometer, amplifier 360 receives maximum signal, and when at the "B" or upper end amplifier 510 receives maximum signal. It will, therefore, be apparent that as the arm moves across the potentiometer the signal input to one amplifier increases while the signal input to the other amplifier decreases, so that the fader circuit 30 operates, under these conditions, as a linear device or control.

The power supply 532 provides bias excitation for the magnetic amplifiers. Its input is connected through the lines 364, 366 to the taps 178, 188 of the distribution circuit. Its output is provided across a pair of shunt potentiometers 534, 536 which are adjustable to compensate for differences in the amplifiers 360 and 510, respectively. The bias windings 514 of amplifier 360 are connected by leads 538, 540 to potentiometers 534 and the bias windings 514 of amplifier 510 are connected by leads 542, 544 to potentiometer 536. The bias windings of each amplifier bias the associated cores to establish the flux density thereof for the initial operating points on the B/H or permeability curve.

The output windings of amplifier 360 are connected by lead 362 to the power line 364 and by lead 355A to one side of the input of the power supply 352A for the "A" gate voltage buses; the other side of power supply 352A being connected by line 358 to the power line 366. The output windings of amplifier 510 are connected at one end through line 362 to the power line 364 and at the other end, by line 355B to one side of the input power supply 352B for the "B" gate voltage buses; the other side being connected by line 358 to the power line 366. The effective impedance of the output windings of each amplifier is controlled by the saturation of the common cores thereof. The rectifiers 548 for each set of output windings polarize the output thereof, so that reverse load current does not effect the initial core saturation which is determined by the bias and control currents. The gain of the amplifiers permits the fader control 266 to be small in size and independent of loading. From the foregoing it will be apparent that changing the energization of the control widings, by operation of the arm 264, to increase or decrease the output available in the associated output windings, as the case may be, increases or decreases, as the case may be, the energization of the power supply for the voltage buses of the associated gating circuits.

In order to vary, change or control the fader linearity, provision is made for the filtered, full-wave D.C. power supply 550, whose input is connected across the power lines 364, 366. The output of the power supply is developed across a taper control potentiometer 552 which is tapped at 554, 556, 558 and 560, representing points at 20%, 40%, and 60% and 80% of the maximum voltage applied across potentiometer 266 by its power supply 504. Switches 562, 564, 566 and 568 apply positive voltage to the taps 554, 556, 558 and 560 respectively.

If switch 562 is closed and the arm 570 of potentiometer 552 is moved therealong, the voltage output of potentiometer 552 will follow the function or relationship indicated at 572 in FIG. 16. Curves 574, 576 and 578 represent the output when switches 564, 566 and 568 respectively are closed. Consequently, it will be apparent that with switch 562 closed, a maximum voltage is obtained across the output of potentiometer 552 with only 20% rotation of the arm 570, and a maximum voltage is obtained with 80% rotation of the arm when the switch 568 is closed; intermediate relationships being obtained when the other switches are closed.

Potentiometer 266 provides output voltage functions as shown at 580 and 582, in FIG. 17, when the fader network is set for linear operation. Curve 582 represents the input to magnetic amplifier 510 and curve 580 represents the input to magnetic amplifier 360.

The taper function switch 522, in addition to the movable arms 520 and 530, also has the movable arms, 584 and 586; all of its arms being ganged. Arm 584 is connected to the arm 570 of taper control 552. Arm 586 is connected to the negative lead 588 from the power supply 550. Each arm has three positions P1, P2 and P3. In position P1, switch 522 puts the output of potentiometer 552 in series with the positive control line 524 to the control windings 512 of the amplifier 360, so that the signal voltage from arm 570 of potentiometer 552 and from arm 264 of potentiometer 266 add. Since said arms are mechanically ganged, as at 590, the input signals to the magnetic amplifier 360 may follow curves 592, 594, 596 or 598 of FIG. 18; depending on the selection of the taper rate switches 562, 564, 566 or 568. In the illustration showing FIG. 18, amplifier 360 leads amplifier 510 in a fade from translation unit 20B to translation unit 20A. If the taper function switch 522 is in position P3, the taper control voltage from potentiometer 552 is placed in series adding relation with the negative signal lead 528 of amplifier 510, so that the latter leads amplifier 360. In position P2, the fader circuit 30 functions in a linear manner, as previously described; the potentiometer 552 being out of circuit with the amplifiers. Therefore, it will be apparent that a fade from one translation device 20 to the other translation device 20 may be accomplished with a lag or lead of 20%, 40%, 60% or 80% respectively.

The previously mentioned switches 256 and 260 are mechanically ganged to potentiometer arms 570 and 264 to indicate the operative and inoperative conditions of the translation devices, as previously explained.

In view of the foregoing, it will be apparent that I have provided a system well adapted to fulfill the objectives previously set forth. While the invention has been illustrated and described in connection with a system to control the intensities of light control circuits, it will be understood that the invention is not limited thereto and that it is within the scope of the present invention to control through suitable servomechanisms other variables of light, such as, for example and not by way of limitation, color, focus, spread, matting, position or load switching.

While the invention has been illustrated and described in connection with a system for controlling twenty light circuits, which system provides for forty-four steps with the variation in step resolution being 2.6 volts or 2.2% it will be understood that the system of the present invention is not limited to the control of twenty light circuits or to a forty-four step resolution.

This completes the description of the lighting control system of the present invention and the manner of its operation. It will be apparent that numerous modifications and variations thereof may be readily made by anyone skilled in the art, in accordance with the principles of the invention hereinabove set forth and without the exercise of any inventive ingenuity. I desire, therefore to be protected for any and all such modifications and variations that may be made within the spirit of the invention and the scope of the claims hereto appended.

What I claim is:

1. Apparatus for effecting a predetermined energization of a control mechanism for a lighting control circuit or the like, said apparatus comprising a translating device, a member having control indicia and adapted for removable association with said translating device, a plurality of signal voltage sources of different predetermined values, normally open switch means in circuit between each voltage source and said control mechanism, said translating device having a control means in circuit with each switch means, each control means being responsive to a predetermined control indicia of said member to effect the closing of its associated switch means to directly apply the associated voltage to said control mechanism to energize said control mechanism in accordance with the signal voltage directly applied thereto, said control means in circuit with each switch means is constituted by a photo-sensitive device, said member being translucent and said control indicia thereon being constituted by an opaque portion to prevent light transmission to an associated photo-sensitive device, and each switch means comprising a de-energized gate circuit provided with a bridge which is balanced when the associated photo-sensitive device is subjected to light and which is unbalanced when light is removed from said photo-sensitive device to trigger said gate circuit.

2. Apparatus for effecting a predetermined operation of control mechanism for a lighting control circuit or the like, said apparatus comprising a translating device adapted for the reception of a member control indicia bearing a plurality of signal voltage sources of different predetermined values, normally open switch means in circuit between each voltage source and said control mechanism, said translating device having a control means in circuit with each switch means, each of said control means being responsive to a predetermined control indicia of a control indicia bearing member to effect the closing of its associated switch means to apply the associated signal voltage to said control mechanism, said control means in circuit with each switch means being a photo-sensitive device, and each switch means comprising a de-energized gate circuit provided with a bridge which is balanced when the associated photo-sensitive device is subjected to light and is unbalanced when light is removed from said photo-sensitive device to trigger said gate circuit.

3. A lighting control apparatus comprising a first and a second control system, each of said systems having provision to operate control mechanism for at least one lighting circuit; each system comprising a translating device adapted for the reception of a member having control indicia, a plurality of signal voltage sources of different predetermined values, normally open switch means in circuit between each voltage source and the control mechanism associated with said system, a control means in said translating device in circuit with each switch means, each control means being responsive to a predetermined control indicia of an associated member to effect the closing of its associated switch means to apply the associated signal voltage to the associated control mechanism; and means to render one system inoperative while the other system is operative, said last mentioned means comprising means to energize the signal voltage sources of the operative system and to de-energize the signal voltage sources of the inoperative system.

4. A lighting control apparatus comprising a first and a second control system, each of said systems having provision to operate control mechanism for at least one lighting circuit; each of said systems comprising a translating device adapted for the reception of a control indicia bearing member, a plurality of signal voltage sources of different predetermined values, normally open switch means in circuit between each voltage source and the control mechanism associated with said system, a control means in said translating device in circuit with each switch means, each control means being responsive to a predetermined control indicia of an associated member to effect the closing of its associated switch means to apply the associated signal voltage to the associated control mechanism; and means to render one system inoperative while the other system is operative, said last mentioned means comprising linear fading means to energize the signal voltage sources of the operative system and to de-energize the signal voltage sources of the inoperative system.

5. A lighting control apparatus as set forth in claim 4, further defined in that the linear fading means comprises an amplifier in each system for controlling the energization of the signal voltage source thereof and a linear variable voltage device operable to progressively energize the amplifier of one system while progressively deenergizing the amplifier of the other system.

6. A lighting control apparatus as set forth in claim 4, further defined in that the linear fading means comprises a magnetic amplifier in each system for controlling the energization of the signal voltage sources thereof and a linear variable voltage device operable to progressively energize the amplifier of one system while progressively deenergizing the amplifier of the other system.

7. A lighting control apparatus comprising a first and a second control system, each of said systems having provision to operate control mechanism for at least one lighting circuit; each system comprising a translating device adapted for the reception of a member having control indicia, a plurality of signal voltage sources of different predetermined values, normally open switch means in circuit between each voltage source and the control mechanism associated with said system, a control means in said translating device in circuit with each switch means, each control means being responsive to a predetermined control indicia of the associated member to effect the closing of its associated switch means to apply the associated signal voltage to the associated control mechanism; and means to render one system inoperative while the other system is operative, said last mentioned means comprising non-linear fading means to energize the signal voltage sources of the operative system and to de-energize the signal voltage sources of the inoperative system to provide a non-linear time relation in changing the operating conditions of said systems.

8. A lighting control apparatus as set forth in claim 7, further defined in that said non-linear fading means includes means for causing one system to lead the other system in changing the operating conditions thereof.

9. A lighting control apparatus as set forth in claim 7, further defined in that said non-linear fading means includes means for causing one system to lag behind the other system in changing the operating conditions thereof.

10. A lighting control apparatus comprising first and second control systems, each for operating control mechanism for at least one lighting circuit; each of said systems comprising a translating device adapted for the reception of a control indicia bearing member, a plurality of signal voltage sources of different predetermined values, normally open switch means in circuit between each voltage source and the control mechanism associated with each system, a control means in said translating device in circuit with each switch means, each control means being responsive to a predetermined control indicia of the associated member to effect the closing of its associated switch means to apply the associated signal voltage to the associated control mechanism; and means to render one system inoperative while the other system is operative, said last mentioned means comprising linear fading means to energize the signal voltage source of the operative system and to deenergize the signal voltage source of the inoperative system, said linear fading means comprising an amplifier in each system for controlling the energization of the signal voltage source thereof and a linearly variable voltage device operable to progressively energize the amplifier of one system while progressively deenergizing the amplifier of the other system, and variable taper means comprising a voltage source and a tapped potentiometer across said source and ganged with said linear voltage device, and means to connect the output of said potentiometer selectively in series adding relation with the output available at one or the other end of said linear voltage device.

References Cited in the file of this patent

UNITED STATES PATENTS

| | | |
|---|---|---|
| 1,065,513 | Eubank | June 24, 1913 |
| 1,799,789 | Gwynne | Apr. 7, 1931 |
| 1,912,613 | Adam | June 6, 1933 |
| 2,573,405 | Clark | Oct. 30, 1951 |
| 2,658,168 | Matson | Nov. 3, 1953 |
| 2,659,038 | Heyer | Nov. 10, 1953 |
| 2,686,282 | Salamonovich | Aug. 10, 1954 |
| 2,694,154 | Kingsbury | Nov. 9, 1954 |
| 2,712,611 | Nyman | July 5, 1955 |
| 2,715,703 | Schuck | Aug. 16, 1955 |
| 2,735,617 | Knutsen | Feb. 21, 1956 |
| 2,741,732 | Cunningham | Apr. 10, 1956 |
| 2,779,540 | Hoeppner | Jan. 29, 1957 |